GATED FLIP-FLOP EMPLOYING PLURAL TRANSISTORS AND PLURAL CAPACITORS COOPERATING TO MINIMIZE FLIP-FLOP RECOVERY TIME

Original Filed June 1, 1965 2 Sheets-Sheet 1

INVENTOR.
EDWIN K. C. YU
BY John V. Regan

INVENTOR.
EDWIN K. C. YU
BY John V. Regan
Attorney

United States Patent Office

Re. 27,928
Reissued Feb. 26, 1974

27,928

GATED FLIP-FLOP EMPLOYING PLURAL TRANSISTORS AND PLURAL CAPACITORS COOPERATING TO MINIMIZE FLIP-FLOP RECOVERY TIME

Edwin K. C. Yu, Norristown, Pa., assignor to RCA Corporation

Original No. 3,398,300, dated Aug. 20, 1968, Ser. No. 460,168, June 1, 1965. Application for reissue May 11, 1970, Ser. No. 36,133
Int. Cl. H03k *3/286*
U.S. Cl. 307—247 13 Claims

Matter enclosed in heavy brackets [ ] appears in the original patent but forms no part of this reissue specification; matter printed in italics indicates the additions made by reissue.

*ABSTRACT OF THE DISCLOSURE*

*A gating arrangement for gating input signals to a bistable multivibrator, or flip-flop. The arrangement includes first and second capacitors for A.C. coupling input signals to set and reset points, respectively, of the flip-flop. In the steady state of the flip-flop, the gating arrangement biases the set and reset points at different values so that the input signal coupled by one of the capacitors is effective to switch the flip-flop. When the flip-flop switches, the gating arrangement provides a further current path for that capacitor.*

Figure 1:
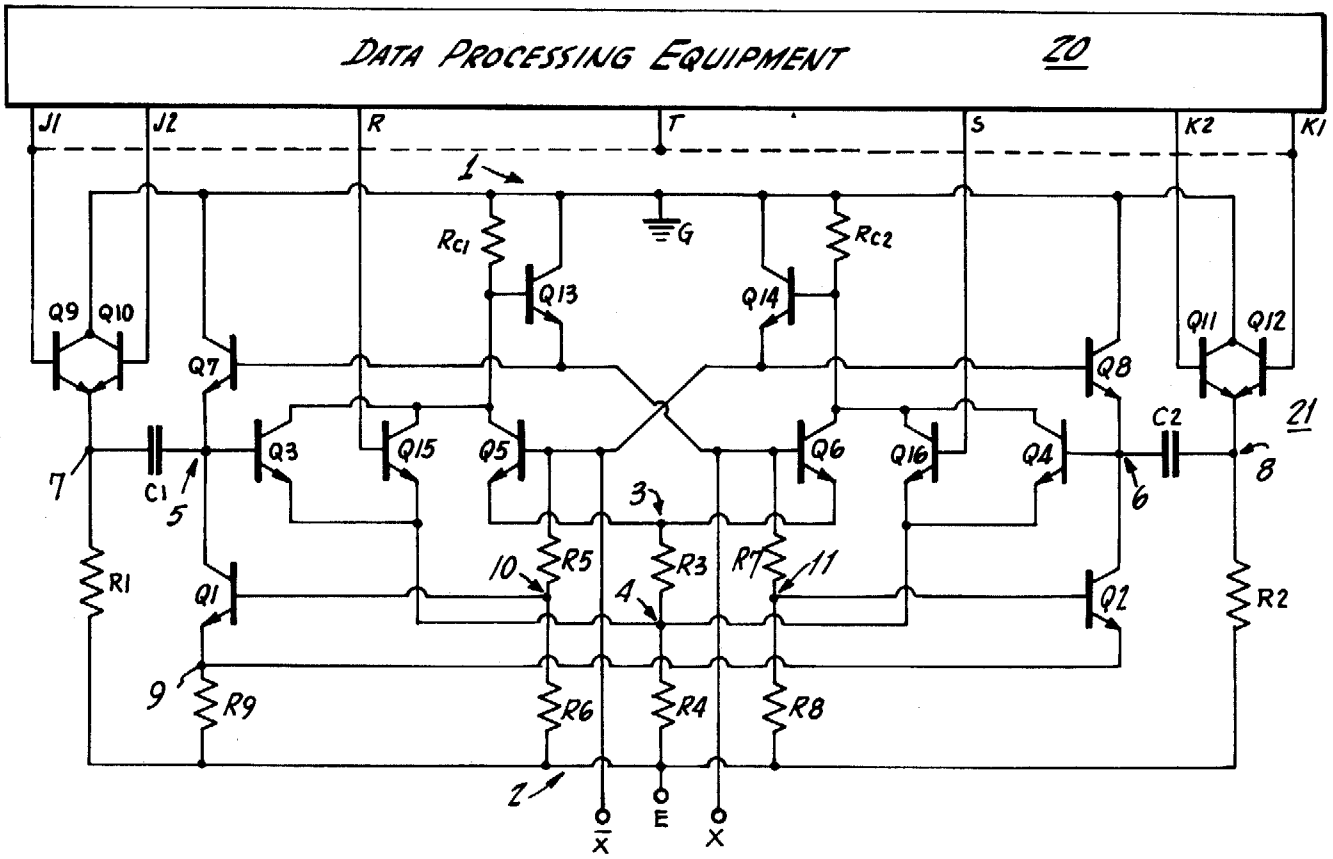

This invention relates to electronic data processing circuitry, and more particularly to bistable multivibrators.

Bistable multivibrators, sometimes referred to as flip-flops, are often used to store information in the form of high and low level signals. A bistable multivibrator, for example, can operate as a register for a binary bit or as a counter of binary bits. Pluralities of bistable multivibrators may be coupled, for example, to operate as a multistage counter or as a multistage register for a plurality of bits.

An exemplary bistable multivibrator may have two transistors connected in the common emitter configuration and regeneratively cross coupled to one another such that one transistor is biased into conduction and the other transistor is biased into nonconduction. Two outputs are generally provided for the flip-flop. For a first stable state, one of the outputs is at a particular voltage level and the other is at a different voltage level corresponding to conduction of one and nonconduction of the other of the transistors. In the second stable state, the transistors reverse their respective conductivity states and the outputs reverse their respective voltage levels.

A flip-flop can have various input circuit arrangements for switching it from one to the other of its stable states. For example, a flip-flop may have two separate inputs, commonly designated as SET and RESET. Digital signals are applied to one only of the SET and RESET inputs at any given time to set or reset the flip-flop to its first or second stable states. Another type of flip-flop may have one common input terminal. Suitable gating circuitry is provided to steer the input signal from the common input terminal for switching the flip-flop between its stable states. Still another type of flip-flop, known as a J–K flip-flop, may have two separate inputs. Input signals may be applied to either one or the other of the inputs at different times or to both of the inputs in common. This invention is particularly concerned with the later type of flip-flop and to an improved gating arrangement therefor.

In many prior art gating arrangements for J–K flip-flops, the input signal is A.C. coupled by way of capacitors and triggering transistors to suitable points in the cross-coupling loop of the flip-flop. When an input signal is applied, capacitor current from one of the capacitors triggers or turns on one of the triggering transistors to switc hthe state of the flip-flop. In a prior art gating arrangement, a resistive network shunting the base-to-emitter junction of the triggering transistor diverts some of this capacitor current from the base of the transistor. This diversion of current limits the turn on time of the triggering transistor, the switching speed of the flip-flop and the repetition rate of the input signals.

It is an object of this invention to provide an improved gating arrangement for a bistable multivibrator.

A more specific object of this invention is to minimize the time required by a gating arrangement to A.C. couple an input signal to a bistable multivibrator.

In accordance with this invention, there is provided a gating arrangement for gating input signals to a bistable multivibrator or flip-flop circuit. The gating arrangement includes four transistors and first and second capacitors interconnected between a source of digital signals and the flip-flop. The signals are A.C. coupled by the first and second capacitors to first and second triggering transistors, respectively, for triggering the flip-flop. The gating arrangement is properly biased to hold each of the triggering transistors in the nonconductive regions of their characteristics by different amounts when the flip-flop is in a steady state or normal condition. When an input signal is applied, the gating arrangement responds so that one only of the triggering transistors turns on to switch the flip-flop. The gating transistors respond to the conditions at the flip-flop outputs so that the base of the triggering transistor being turned on in response to the input signal receives substantially all of the current from its associated capacitor at least until the voltage levels at the flip-flop outputs become equal to one another during the switching transition. At or after this time, the input signal terminates and one of the four gating transistors provides an additional current path for the capacitor associated with the triggering transistor which was turned on. With less base current, the triggering transistor tends to turn off and the flip-flop becomes fully switched. Consequently, the gating arrangement acts to minimize the recovery time of the flip-flop by minimizing the recovery time of the gating arrangement itself and the turn-on time of the triggering transistors associated therewith.

Figure 2:
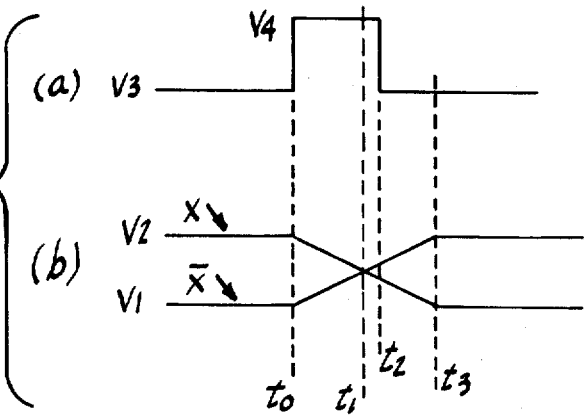
Figure 3:
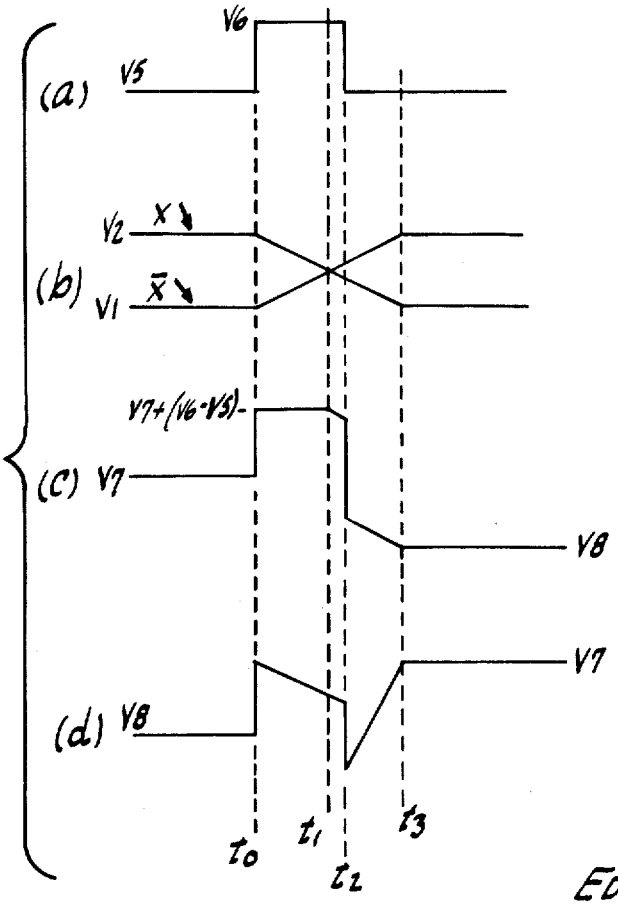

FIG. 1 is a circuit diagram of a bistable multivibrator and a gating arrangement in accordance with this invention;

FIGS. 2(a) and 2(b) are waveform diagrams of a set or reset signal and the flip-flop output signals, respectively; and FIGS. 3(a) and 3(b) are waveform diagrams of an input signal and the flip-flop output signals, respectively; while FIGS. 3(c) and 3(d) are waveform diagrams taken at different points in the gating arrangement.

In FIG. 1, electronic data processing equipment 20 may have a plurality of bistable multivibrators, one of which is illustrated generally at 21. The bistable multivibrator 21 may have a plurality of inputs J1, J2, R, S, K1, K2 and T and a plurality of outputs X and $\overline{X}$. These inputs illustrated as being connected to the data processing equipment 20 may, for example, be connected to the outputs of like bistable multivibrators or to other appropriate signal handling apparatus within the data processor. Likewise, the outputs X and $\overline{X}$ may be connected to the inputs of like multivibrators or to other appropriate digital signal handling apparatus within the data processor.

Referring now to the bistable multivibrator 21, transistors Q5 and Q6 are each connected in the common emitter configuration and cross-coupled to one another for operation as a bistable multivibrator. The collector electrode of transistor Q5 is coupled to the base electrode of transistor Q6 by way of the base emitter junction of transistor Q13. The collector electrode of transistor Q6 is coupled to the base electrode of transistor Q5 by way of the base-emitter junction of transistor Q14. The collector electrodes of transistors Q5 and Q6 are also connected by way of resistors $R_{C1}$ and $R_{C2}$, respectively, to a circuit point 1. The base electrode of transistor Q5 is connected by way of resistors R5 and R6 to a circuit point 2. The base electrode of transistor Q6 is also connected to circuit point 2 by way of resistors R7 and R8. The emitter electrodes of transistors Q5 and Q6 are connected in common at circuit point 3. Circuit point 2 is connected to circuit point 3 by way of resistors R3 and R4. Output connections X and $\overline{X}$ are coupled to the base electrodes of transistor Q6 and Q5, respectively.

The circuit as described in the preceding paragraph is operable as a bistable multivibrator upon the application of suitable operating potential between circuit points 1 and 2. For transistors of the illustrated NPN conductivity type, circuit point 1 is arbitrarily connected to the ground reference, indicated by the conventional symbol at G; and circuit point 2 is connected to a potential E which is more negative than the ground reference G.

The cross coupled pair of transistors Q5 and Q6 operate in the current mode as a bistable multivibrator or flip-flop. Potential source E and resistors R3 and R4 act as a source of substantially constant current for the cross-coupled pair. For a first stable state, transistor Q5 is cut off and transistor Q6 is conducting. The current supplied by source E and resistors R3 and R4 is steered through the collector-to-emitter path of transistor Q6 and resistor $R_{C2}$ to ground at circuit point 1. The current flowing in resistor $R_{C2}$ results in a relatively low voltage level at the collector electrode of transistor Q6 which is coupled by emitter-follower transistor Q14 to the output connection $\overline{X}$. The relatively low voltage level at the output connection $\overline{X}$ is illustrated as the level V1 in FIGS. 2(b) and 3(b). With substantially no current flowing in resistor $R_{C1}$, the collector electrode of transistor Q5 is at a relatively high voltage level which is coupled by emitter-follower transistor Q13 to output connection X. The relatively high voltage level at output connection X is illustrated as the level V2 in FIGS. 2(b) and 3(b). Thus, for the first stable state, transistor Q6 conducts; transistor Q5 is cut off; output connection X is at a relatively high voltage level; and output connection $\overline{X}$ is at a relatively low voltage level. The waveforms in FIGS. 2(b) and 3(b) illustrate the first stable state prior to time $t_0$.

Transistors Q13 and Q14 which are connected as emitter-follower buffer stages serve to prevent overloading of the flip-flop transistors Q5 and Q6. The emitter-follower transistors also provide level shifting to prevent saturation of the flip-flop transistors Q5 and Q6.

For the second stable state of the flip-flop transistor Q5 conducts and transistor Q6 is cut off. The current is now steered through the collector-to-emitter path of transistor Q5 and resistor $R_{C1}$ to ground. The collector of transistor Q5 is at a relatively low voltage which is coupled by emitter-follower transistor Q13 to the output connection X. With substantially no current flowing in resistor $R_{C2}$ the collector of electrode of transistor Q6 is at a relatively high voltage level which is coupled to output connection $\overline{X}$ by emitter-follower transistor Q14. Thus, for the second stable state, transistor Q5 conducts; transistor Q6 is cut off; output connection X is at a relatively low voltage level; and output connection $\overline{X}$ is at a relatively high voltage level. The waveforms in FIGS. 2(b) and 3(b) illustrate the second stable state after time $t_3$.

The first and second stable states of the flip-flop are summarized in Table I.

TABLE I

| State | 1 | 2 |
|---|---|---|
| Transistor Q5 | Cut off | Conducting. |
| Transistor Q6 | Conducting | Cut off. |
| X | High level V2 | Low level V1. |
| $\overline{X}$ | Low level V1 | High level V2. |

The bistable multivibrator or flip-flop may be switched between its two stable states by SET and RESET operations. For these operations the collector electrodes of transistors Q5 and Q6, respectively. The base electrodes of transistors Q15 and Q16 are coupled to RESET and SET inputs R and S, respectively. The emitter electrodes of transistors Q15 and Q16 are connected to a circuit point 4 to which resistors R3 and R4 are also connected.

The RESET operation switches the flip-flop from the first stable state to the second stable state; while the SET operation switches the flip-flop from the second to the first stable state. The R and S inputs are normally held at a relatively low voltage level so that transistors Q15 and Q16 are cut off. In FIG. 2(a) the relatively low level is illustrated as level V3. Input signals illustrated in FIG. 2(a) as an abrupt change from voltage level V3 to voltage level V4 may be applied by data processing equipment 20 to the R or S inputs for RESET or SET operations, respectively.

If the flip-flop is in its first stable state when a RESET operation occurs at time $t_0$, the signal applied by the R input to the base electrode of transistor Q15 tends to forward bias the transistor. As transistor Q15 becomes more forward biased, an increasing amount of current begins to flow to source E and resistor R4 through the collector-to-emitter path of the transistor Q15 and resistor $R_{C1}$. The voltage level at the collector electrode of transistor Q5 begins to decrease due to the increasing current flow in resistor $R_{C1}$. At the same time the current flowing in resistor $R_{C2}$ and the collector-to-emitter path of transistor Q6 begins to decrease so that the voltage level at the collector electrode of transistor Q6 increases. The emitter-follower transistors Q13 and Q14 regeneratively couple these decreasing and increasing collector voltages to the output connections X and $\overline{X}$, respectively. When the output $\overline{X}$ becomes slightly more positive than output X at or about time $t_1$, transistor Q5 begins to conduct. The input signal at the R input may be terminated or returned to the voltage level V3 at time $t_1$ or at a later time $t_2$, as desired. The regenerative coupling continues until transistor Q5 attains its stable state of conductivity at time $t_3$. The flip-flop is now in its second stable state.

If the flip-flop is in its second stable state when a RESET operation occurs, the input signal tends to forward bias transistor Q15. The current in the collector-to-emitter path of transistor Q5 tends to decrease; while the current in the collector-to-emitter path of transistor Q15 tends to increase. The net result is that the current in resistor $R_{C1}$ does not change substantially so that the voltage at the collector of transistor Q5 remains substantially unchanged. When the input signal at the R input terminates, transistor Q15 cuts off and transistor Q5 returns to its stable state of conductivity. Thus, the RESET operation has no effect on the state of the flip-flop for this condition.

If the flip-flop is in its second stable state, it may be switched to its first stable state by a SET operation in much the same manner as the RESET operation switches the flip-flop from its first to second stable state. As in the case of a RESET operation occuring when the flip-flop is in its second stable state, a SET operation occurring when the flip-flop is in its first stable state has no effect on the state of the flip-flop.

Additional input circuitry is provided for switching the flip-flop between its stable states. The additional circuitry includes a gating arrangement for A.C. coupling to the flip-flop, an input signal applied to either one of two separate inputs J1 or K1 or to both of them in common.

The additional input circuitry also includes triggering transistors Q3 and Q4 which have their collector-to-emitter paths connected in parallel or across the collector-to-emitter paths of transistors Q15 and Q16, respectively. Transistors Q3 and Q4 are normally biased into the nonconductive or cut off regions of their characteristics by the voltage conditions existing at the respective base and emitter electrodes of the two transistors. The voltage conditions existing at the emitter electrodes of transistors Q3 and Q4 are fixed during the steady state or normal condition of the flip-flop by source E and the current flow in resistor R4. Since both emitter electrodes are connected to circuit point 4, the voltage condition for the two emitters is one and the same. The gating arrangement normally maintains the base electrodes of transistors Q3 and Q4 at different voltage levels which bias the respective transistors by differing degrees into the cutoff or nonconductive regions of their characteristics.

The gating arrangement includes A.C. coupling capacitors C1 and C2 which are connected between the base electrodes of transistors Q3 and Q4 at circuit points 5 and 6, respectively, and circuit points 7 and 8. Circuit points 7 and 8 are coupled to the source E at circuit point 2 by way of resistors R1 and R2, respectively. Circuit point 7 is also connected in common with the emitter electrodes of transistors Q9 and Q10. Circuit point 8 is also connected in common with the emitter electrodes of transistors Q11 and Q12. The collector electrodes of transistors Q9 through Q12 are connected in common to circuit point 1. The base electrodes of transistors Q9 through Q12 are connected to inputs J1, J2, K1 and K2.

Circuit points 5 and 6 are also connected to the emitter electrodes of transistors Q7 and Q8. The collector electrodes of transistors Q7 and Q8 are connected in common at circuit point 1. The base electrodes of transistors Q7 and Q8 are connected to the output connections X and $\overline{X}$ of the flip-flop.

Circuit points 5 and 6 are also connected to the collector electrodes of transistors Q1 and Q2, respectively. The emitter electrodes of transistors Q1 and Q2 are connected in common at circuit point 9. Circuit point 9 is connected by way of resistor R9 to the source E. The base electrode of transistor Q1 is connected to resistors R5 and R6 at circuit point 10. The base electrode of transistor Q2 is connected to resistors R7 and R8 at circuit point 11.

Transistors Q9 through Q12 are each connected in the common collector or emitter follower configuration. Consequently, the inputs J1 and J2 normally hold the base electrodes of transistors Q9 and Q10 at voltage levels such that either or both conducts; and the inputs K1 and K2 normally hold the base electrodes of transistors Q11 and Q12 at voltage levels such that either or both conducts. For purposes of illustration, it is assumed that inputs J1 and K1 hold the base electrodes of transistors Q9 and Q11 at a relatively low voltage level illustrated as level V5 in FIG. 3(a) and that the inputs J2 and K2 hold the bases of transistors Q10 and Q12 at some voltage level equal to or less than the level V5. Consequently, the circuit points 7 and 8 are at voltage levels which are less than the voltage level V5 by the voltages across the base-to-emitter junctions of transistors Q9 and Q11, respectively.

As in the SET and RESET operations, input signals may be applied by data processing equipment 20 to the J1 and K1 inputs. These input signals are illustrated in FIG. 3(a) as abrupt changes in voltage from level V5 to level V6. In contrast to the SET and RESET operations, an input signal may be applied to the J1 and K1 inputs in common as illustrated by the dotted connections to common input T. In order to satisfy this input condition, the gating arrangement normally maintains the base electrodes of triggering transistors Q3 and Q4 at different voltage levels which bias the respective transistors by differing degrees into the cutoff or nonconductive regions of their characteristics so that when a signal is coupled to circuit points 5 and 6, one only of the triggering transistors conducts.

For the first stable state of the flip-flop, transistor Q5 is cut off and transistor Q6 is conducting. The output connection X is at the higher voltage level V2, as illustrated in FIG. 3(b). Resistor R7 couples the higher voltage level V2 from output X to the base of transistor Q2, biasing the transistor into conduction. The D.C. voltage level at circuit point 6 is clamped at a voltage level, which is less than the $\overline{X}$ output level V1, by the voltage across the base-to-emitter junction of transistor Q8. This D.C. level is illustrated as level V8 in FIG. 3(d).

Resistor R5 couples the lower voltage level V1 from output $\overline{X}$ to the base of transistor Q1, biasing the transistor into the cutoff region of its characteristic. With transistor Q1 cut off and the relatively high voltage level V2 of output X at the base of transistor Q7, circuit point 5 tends to be at a D.C. voltage level which is less than the level V2 by the voltage across the base-to-emitter junction of transistor Q7. This D.C. level is illustrated as level V7 in FIG. 3(c). Consequently, circuit point 5 is at a higher voltage level than circuit point 6 by an amount which is approximately the difference between the output levels V1 and V2 assuming that the voltage drops across base-to-emitter junctions of transistors Q7 and Q8 are equal. The voltage level V7 at circuit point 5 is sufficient to slightly bias the transistor Q3 into the cutoff region of its characteristic; whereas the lower voltage level V8 at circuit point 6 biases transistor Q4 into the cutoff region of its characteristics by an amount substantially equal to the difference between the output voltage levels.

If an input signal is applied to the common input T, the emitter-follower transistors Q9 and Q12 and the capacitors C1 and C2 A.C. couple the input signal to circuit points 5 and 6, respectively. The signal raises the voltage at circuit points 5 and 6 by an amount equal to the difference between the levels V5 and V6. Assuming that the difference between the input levels V5 and V6 is substantially equal to the difference between the steady state voltage levels at circuit points 5 and 6 (that is, approximately equal to the difference between output levels V1 and V2), the increase in voltage at circuit point 6 is inadequate to bias transistor Q4 into conduction.

On the other hand, the increase in voltage at circuit point 5 biases transistor Q3 into conduction and temporarily biases transistor Q7 into nonconduction. With transistors Q1 and Q7 cut off, substantially all of the current from capacitor C1 is applied to the base electrode of transistor Q3. Transistor Q3 turns on rapidly to initiate switching of the flip-flop from its first to its second stable state in much the same manner as described previously for the RESET operation.

As described previously, the voltage levels at the collector electrode of transistor Q5 and the output X decrease while the levels at the collector electrode of transistor Q6 and output $\overline{X}$ increase during the transition or switching of the flip-flop. When output $\overline{X}$ becomes slightly more positive than output X, transistor Q5 begins to conduct at or about time $t_1$. The input signal at the T input may be terminated or returned to the voltage level V5 at time $t_1$ or at a later time $t_2$, as desired. The voltage level at circuit point 5 decreases rapidly as illustrated in FIG. 3(c). As the input signal terminates at time $t_2$, transistor Q3 tends to cut off. Transistor Q7 turns on to limit the D.C. voltage level of circuit point 5 to the level V8 which is less than the second stable state voltage level V1 of output X by the voltage across the base-to-emitter junction of transistor Q7.

As the input signal terminates and as transistor Q2 tends to cut off due to the decreasing voltage level at the output X, the increasing voltage of output $\overline{X}$ is coupled to circuit point 6 by the base-to-emitter junction of transistor Q8. As the flip-flop approaches its second stable state, circuit point 6 approaches the D.C. voltage level V7 which is less than the voltage level V2 by the voltage across the base-to-emitter junction of transistor Q8. Thus, the flip-flop is switched and circuit points 5 and 6 have exchanged D.C. voltage levels.

The next input signal applied to the common input T switches the flip-flop from its second to its first stable state in substantially the same manner.

The connections of transistors Q1 and Q2 in the gating arrangement is advantageous to the bistable multivibrator in that they provide for rapid recovery time or switching. This is because substantially all of the current from one of the capacitors C1 or C2 is applied to the base of one of the triggering transistors Q3 or Q4 in response to the digital input signal. The transistor Q1 or Q2 associated with the triggering transistor Q3 or Q4, which is being turned on, is biased into cutoff until the flip-flop transistors Q5 and Q6 begin to change states. With substantially all of the current from capacitor C1, for example, being applied to the base of transistor Q3 in response to the input signal, transistor Q3 turns on rapidly.

It is apparent that an input signal may be applied to either one of the inputs J1 or K1 at any one time. Depending upon which state the flip-flop is in and upon which input applies the signal, the flip-flop either does or does not switch. For example, an input signal applied to input K1 when the flip-flop is in its first stable state is insufficient to turn on triggering transistor Q4. Likewise, an input signal applied to input J1 when the flip-flop is in its second stable state is insufficient to turn on triggering transistor Q3. However, if the stable state of the flip-flop is reversed for each of the preceding examples, the flip-flop switches in response to the signal applied to input K1 or J1, respectively.

It is apparent that the difference between input levels V5 and V6 does not need to be equal to the difference between the output levels V1 and V2 as assumed above. It is only necessary that the difference between input levels V5 and V6 be sufficient to render one only of the triggering transistors Q3 or Q4 conductive.

The additional inputs J2 and K2 may be utilized in a number of different ways. One use may be to inhibit either the J1 or K1 input. This could be accomplished by holding either the J2 or K2 input at a voltage level which is sufficiently more positive than voltage level V5 so that an input signal applied to the J1 or K1 input does not turn on the associated triggering transistor Q3 or Q4 irrespective of the state of the flip-flop.

It is apparent to those skilled in the art that resistances R5 and R7 function primarily as level shifting means. Accordingly, it is apparent that any appropriate level shifting means, such as diodes or diode and resistor combinations, may be used.

Although the invention has been illustrated with transistors of the NPN conductivity type, it is apparent that the transistors may be of the PNP conductivity type provided that the polarities of the input signals and the reference sources E and G are suitably changed.

What is claimed is:

1. The combination comprising
a flip-flop circuit having a pair of output terminals,
a gating arrangement including first, second, third and fourth transistors each having a base, emitter and collector electrode,
first and second capacitors,
means for coupling the base electrode of said first transistor to one of said output terminals and the base electrode of said second transistor to the other of said output terminals, means for coupling the base electrodes of said third and forth transistors to said other and said one output terminals, respectively,
means for coupling the emitter electrode of said first transistor, the collector electrode of said third transistor and said first capacitor to said one output terminals,
means for coupling the emitter electrode of said second transistor, the collector electrode of said fourth transistor, and said second capacitor to said other output terminal,
means for coupling the collector electrodes of said first and second transistors to a first circuit point, and
means for coupling the emitter electrodes of said third and fourth transistors to a second circuit point.

2. The combination as claimed in claim 1 wherein
connection means are adapted to connect said flip-flop and said gating arrangement to suitable operating potential, and
input means are adapted to apply input signals to said gating arrangement.

3. The combination comprising
a flip-flop circuit having a pair of output terminals,
a gating arrangement including first, second, third and fourth transistors each having a base, emitter and collector electrode,
first and second capacitors,
means for coupling the base electrode of said first transistor to one of said output terminals and the base electrode of said second transistor to the other of said output terminals,
means for coupling the base electrodes of said third and fourth transistors to said other and said one output terminals, respectively,
means including a first triggering transistor for coupling the emitter electrode of said first transistor, the collector electrode of said third transistor and said first capacitor to said one output terminal,
means including a second triggering transistor for coupling the emitter electrode of said second transistor, the collector electrode of said fourth transistor, and said second capacitor to said other output terminal,
means for coupling the collector electrodes of said first and second transistors to a first circuit point, and
means for coupling the emitter electrodes of said third and fourth transistors to a second circuit point.

4. The combination as claimed in claim 3 wherein
input means are adapted to apply input signals by way of said first and second capacitors to said first and second triggering transistors, respectively.

5. The combination comprising
a flip-flop circuit having first and second output terminals, said flip-flop being in a first stable state when said first and second output terminals are at high and low voltage levels, respectively, and in a second stable state when said first and second output terminals are at low and high voltage levels, respectively,
a gating arrangement including first, second, third and fourth transistors each having a base, emitter and collector electrodes,
first and second capacitors,
means for coupling the base electrode of said first transistor to said first output terminal and the base electrode of said second transistor to said second output terminal,
means for coupling the base electrodes of said third and fourth transistors to said second and first output terminals, respectively,
means for coupling the emitter electrode of said first transistor, the collector electrode of said third transistor and said first capacitor to a first circuit point,
means for coupling the emitter electrode of said second transistor, the collector electrode of said fourth transistor, and said second capacitor to a second circuit point, means for coupling the collector electrodes of said first and second transistors to a third circuit point, means for coupling the emitter electrodes of said third and fourth transistors to a fourth circuit point, means including first and second triggering transistors for coupling said first and second circuit points, respectively, to said first and second output terminals, respectively, means for applying operating potential to said third and fourth circuit points and said flip-flop, the D.C. voltage levels at said first and second circuit points being sufficient to bias said first and second triggering transistors into nonconductive regions of their operating characteristics by differing amounts and to bias one of said third and fourth transistors into the nonconductive region of its characteristic, and means for applying input signals by way of said first and second capacitors to said first and second circuit points, respectively, said signals being sufficient in magnitude to turn on one of said first and second triggering transistors, said one of said third and fourth transistors remaining nonconductive at least until the voltage level of said first output terminal is equal to the voltage level of said second output terminal.

6. The combination comprising a flip-flop having at least first and second transistors each having a base, emitter and collector electrode, said first and second transistors being connected in the common emitter configuration and cross coupled to one another, third, fourth, fifth and sixth transistors each having a base, emitter and collector electrode, first and second capacitors, means for coupling the collector electrodes of said first and second transistors to the base electrodes of said third and fourth transistors, respectively, means for coupling the base electrodes of said fifth and sixth transistors to the base electrodes of said first and second transistors, respectively, means for coupling the emitter electrode of said third transistor, the collector electrode of said fifth transistor and said first capacitor to the collector electrode of said first transistor, means for coupling the collector electrodes of said first, second, third and fourth transistors to a first circuit point, means for coupling the emitter electrode of said fourth transistor, the collector electrode of said sixth transistor, and said second capacitor to the collector electrode of said second transistor, and means for coupling the emitter electrodes of said first, second, fifth and sixth transistors to a second circuit point.

7. A gating arrangement in combination with an input source adapted to apply input signals during switching intervals, a flip-flop having first and second inputs and first and second outputs, and first and second triggering transistors associated with said first and second flip-flop inputs, respectively, each said transistor having a base electrode, said flip-flop being in a first stable state when said first and second outputs are at high and low voltage levels, respectively, and in a second stable state when said first and second outputs are at low and high voltage levels, respectively, said triggering transistors being nonconductive during said stable states, said gating arrangement comprising first and second capacitors coupled between said source and said first and second transistor base electrodes, respectively, for rendering one of said first and second transistors conductive during said switching intervals, third and fourth transistors each having a base, collector and emitter electrode, means for coupling said third and fourth transistor base electrodes to said flip-flop second and first outputs, respectively, whereby one of said third and fourth transistors is nonconductive and the other is conductive when said flip-flop is in its stable states, and means for coupling the collector and emitter electrodes of said third and fourth transistors in circuit with said first and second capacitors, respectively, whereby during switching intervals substantially all of the discharge current of the one of said first and second capacitors associated with said nonconductive one of said third and fourth transistors is available to render the associated one of said first and second transistors conductive to thereby initiate switching of said flip-flop, said nonconductive one of said third and fourth transistors thereafter becoming conductive in response to said flip-flop being partially switched to rapidly discharge said associated capacitor thereby rendering nonconductive said associated one of said first and second transistors.

8. The invention according to claim 7 wherein fifth and sixth transistors are provided with each having a base-emitter junction connected in circuit with said first and second capacitors, respectively, and wherein means including said fifth and sixth transistor base-emitter junctions limit the D.C. voltage levels at said first and second transistor base electrodes during said stable states.

9. The invention according to claim 8 wherein seventh and eighth emitter-follower transistor circuits buffer said input signals to said first and second capacitors, respectively.

10. The invention according to claim 9 wherein said D.C. voltage levels provided at said first and second transistor base electrodes by said gating arrangement during said stable states are sufficient to bias said first and second transistors into nonconduction by differing amounts.

11. The invention according to claim 10 wherein the stable state D.C. voltage level at said one of the first and second transistor base electrodes is determined primarily by the base-emitter junction circuit of the associate one of said fifth and sixth transistors, and wherein the stable state D.C. voltage level at said other of first and second transistor base electrodes is determined primarily by the conductive collector-emitter circuit of the other of said third and fourth transistors.

12. The invention according to claim 11 wherein all of said transistors are of the same conductivity type.

13. The invention according to claim 12 wherein said fifth and sixth transistor base-emitter junctions are coupled between said first and second capacitors and said first and second flip-flop outputs, respectively.

References Cited

The following references, cited by the Examiner, are of record in the patented file of this patent or the original patent.

UNITED STATES PATENTS

| | | | |
|---|---|---|---|
| 2,924,725 | 2/1960 | Blair | 307—291 |
| 3,317,750 | 5/1967 | Narud et al. | 307—291 |
| 3,178,584 | 4/1965 | Clark | 307—291 |

JOHN ZAZWORSKY, Primary Examiner

U.S. Cl. X.R.

307—246, 291